United States Patent
Wu

(10) Patent No.: US 10,404,106 B2
(45) Date of Patent: Sep. 3, 2019

(54) MULTI-FUNCTION FREQUENCY CONVERSION CHARGING DEVICE

(71) Applicant: KINGDO CLOUD INFORMATION PTE. LTD., Singapore (SG)

(72) Inventor: Juan-Hung Wu, New Taipei (TW)

(73) Assignee: KINGDO CLOUD INFORMATION PTE. LTD., Singapore (SG)

( * ) Notice: Subject to any disclaimer, the term of this patent is extended or adjusted under 35 U.S.C. 154(b) by 83 days.

(21) Appl. No.: 15/853,963

(22) Filed: Dec. 26, 2017

(65) Prior Publication Data

US 2019/0199140 A1    Jun. 27, 2019

(51) Int. Cl.
| | |
|---|---|
| *H02J 50/40* | (2016.01) |
| *H02J 50/70* | (2016.01) |
| *H02J 7/02* | (2016.01) |
| *H02J 50/10* | (2016.01) |
| *H02J 50/80* | (2016.01) |

(52) U.S. Cl.
CPC .............. *H02J 50/40* (2016.02); *H02J 7/025* (2013.01); *H02J 50/10* (2016.02); *H02J 50/70* (2016.02); *H02J 50/80* (2016.02)

(58) Field of Classification Search
CPC .. H02J 50/40; H02J 50/80; H02J 50/10; H02J 50/70; H02J 7/025
See application file for complete search history.

(56) References Cited

U.S. PATENT DOCUMENTS

2018/0309328 A1* 10/2018 Hwang ................... H02J 50/12

\* cited by examiner

*Primary Examiner* — Robert L Deberadinis
(74) *Attorney, Agent, or Firm* — Leong C. Lei

(57) ABSTRACT

The present invention relates to a multi-function frequency conversion charging device, which mainly includes: a first circuit board; a high-frequency receiver module; at least one power transmission portion; a second circuit board; a low-frequency transceiver module to selectively receive the power initiation of the high-frequency receiver module and wirelessly charge a second electronic device; and at least one magnetic portion for filtering the noise and reducing the interference. The high-frequency receiver module is used to react with the high-frequency wireless charger to produce electricity, and then proceed the wired charging to the electronic device through the power transmission portion if the electronic device has no function of wireless charging; otherwise the wireless charging is proceeded through the low-frequency transceiver module and the interference between the high-frequency and low-frequency transceiver module is effectively isolated by utilizing the magnetic portion if the electronic device just supports the low-frequency wireless charging.

10 Claims, 9 Drawing Sheets

MULTI-FUNCTION FREQUENCY CONVERSION CHARGING DEVICE

(a) TECHNICAL FIELD OF THE INVENTION

The present invention provides a multi-function frequency conversion charging device, especially relates to a multi-function frequency conversion charging device which receives the wireless high-frequency charging signal to proceed the charging for an electronic device without wireless charging function or just having the function of low-frequency wireless charging.

(b) DESCRIPTION OF THE PRIOR ART

The wireless charging which is called the induction charging or the non-contact inductive charging, is to transmit the power generated by the power supply equipment, the charger, to the electric device by applying a way of the near-field induction, the inductive coupling. The power received by the electric device can charge the battery or provide for its own operation.

Basically, it does not need to use the electric wires to connect the power supply equipment and the electric device if applying the inductive coupling to transmit the power. Therefore, both of the power supply equipment and the electric device can be made without exposing the conductive contacts, which will let the charging process look like more convenient.

If not considering the problems of the charging efficiency and the charging speed, the biggest problems which the present wireless charger face are mostly about the high cost and the low compatibility.

Considering the cost, the charger needs the electronic circuits to push the coil, and the electric device needs the electronic devices to do the power conversion. Both of them need the coils and the high-frequency filter circuit to satisfy the specification of FCC. Consequently, the cost will be higher than the direct contact one.

Considering the compatibility, different brands of the wireless charging devices cannot be replaced universally owing to no uniform standard although the Qi standard has been widely applied in a variety of popular mobile phones in the end of 2012 and the industry organization WPC has begun to promote the standardization. Consequently, the wireless charging technology has not been widespread and largely applied all the time being.

Especially today, the differences of the development goals and the business principles between the two major operating systems, Android and iOS, cause the extreme confusion and trouble for the wireless charger industry and the consumer when applying.

For example, it needs to pay a very high cost if wanting to take the wireless charging of the two operating systems into account. Otherwise, it is impossible to simultaneously satisfy the charging demand of the two operating systems for the consumer.

SUMMARY OF THE INVENTION

The main objective of the present invention is utilizing a simple structure to provide the high-frequency and low-frequency charging signals which is adapted to various kinds of cellular phones with different charging demands and integrating the technologies of the high-frequency and low-frequency charging to effectively solve the interference problems between them.

To achieve the above objectives, the present invention includes: a first circuit board; a high-frequency receiver module set on the first circuit board to provide for wirelessly connecting with a high-frequency wireless charger to transform and produce electricity; at least one power transmission portion set on the first circuit board and electrically connected with the high-frequency receiver module to electrically connect with an first electronic device having a charging portion selectively for wired charging the first electronic device; a second circuit board set at one side of the first circuit board and electrically connected with the first circuit board; a low-frequency transceiver module set on the second circuit board and electrically connected with the high-frequency receiver module to selectively receive the power initiation of the high-frequency receiver module and wirelessly charge a second electronic device; and at least one magnetic portion set between the first circuit board and the second circuit board to provide for filtering the noise and reducing the interference.

The high-frequency receiver module can be used to react with the high-frequency wireless charger to produce electricity, and then proceed the wired charging to the first electronic device through the power transmission portion when the user utilizing the present invention to proceed the wireless charging.

On the other hand, the electricity produced by the high-frequency receiver module will turn to activate the low-frequency transceiver module, and then proceed the wireless charging to the second electronic device through the low-frequency transceiver module if the charging object is the second electronic device which just supports the low-frequency wireless charging. And, the magnetic portion can be utilized to isolate the interference between the high-frequency and low-frequency transceiver module, and so as to exactly achieve the purpose of integrating the high-frequency and low-frequency charging.

The problems of high cost and low compatibility of the traditional wireless charging device can be overcome and so as to achieve practical progress for above advantages through utilizing the above-mentioned technologies.

DETAILED DESCRIPTION OF THE PREFERRED EMBODIMENTS

The following descriptions are exemplary embodiments only, and are not intended to limit the scope, applicability or configuration of the invention in any way. Rather, the following detailed description provides a convenient illustration for implementing exemplary embodiments of the invention. Various changes to the described embodiments may be made in the function and arrangement of the elements described without departing from the scope of the invention as set forth in the appended claims.

Figure 1:
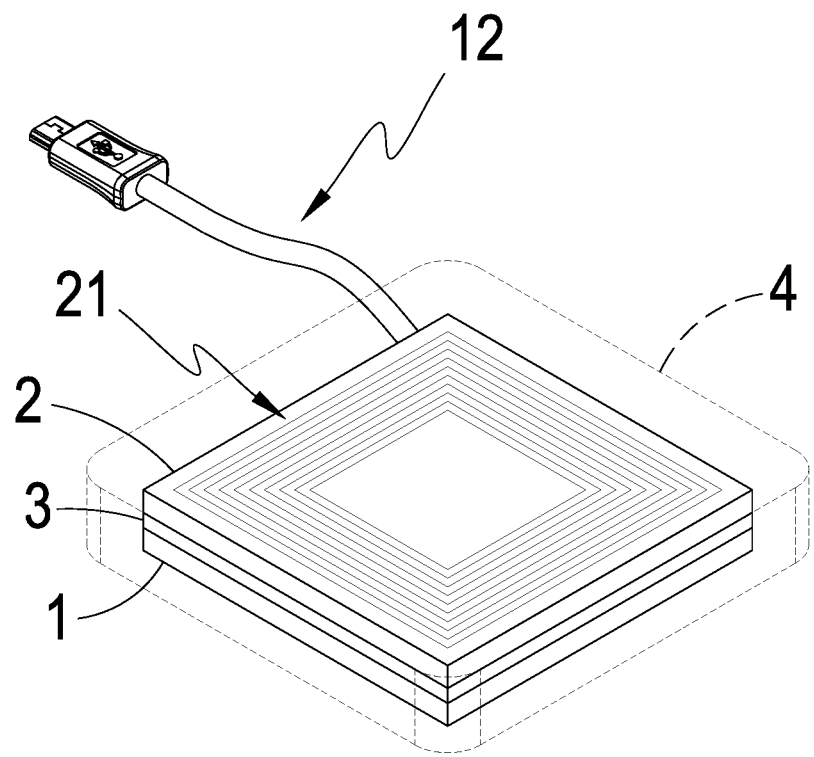
FIG. 1 is a perspective view of the preferred embodiment according to the present invention.
Figure 2:
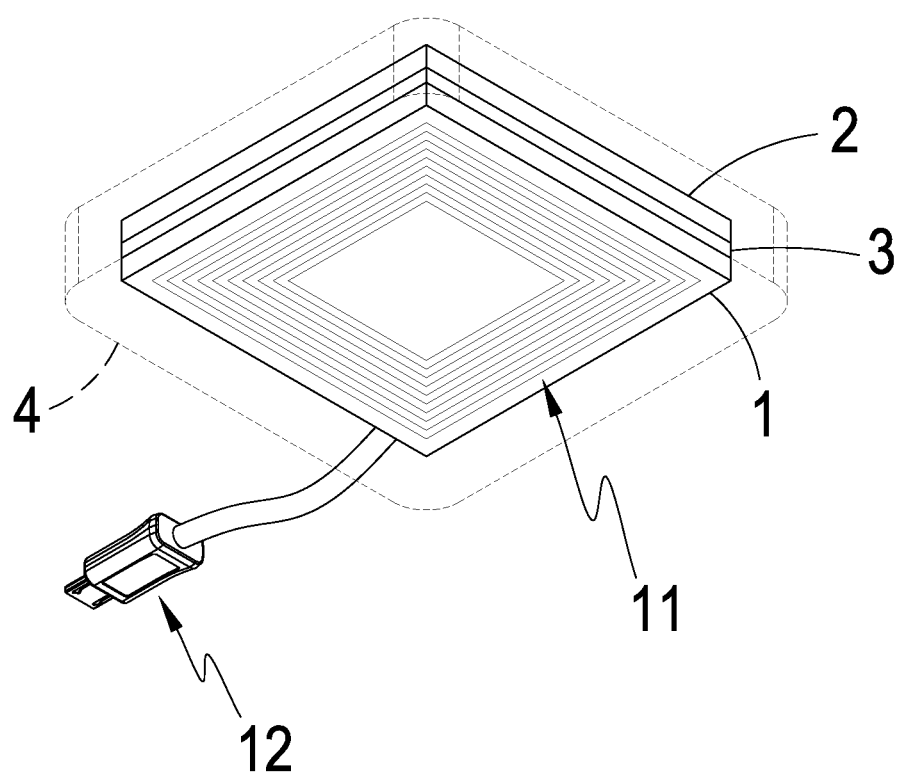
FIG. 2 is a perspective view of the preferred embodiment by another angle according to the present invention.
Figure 3:
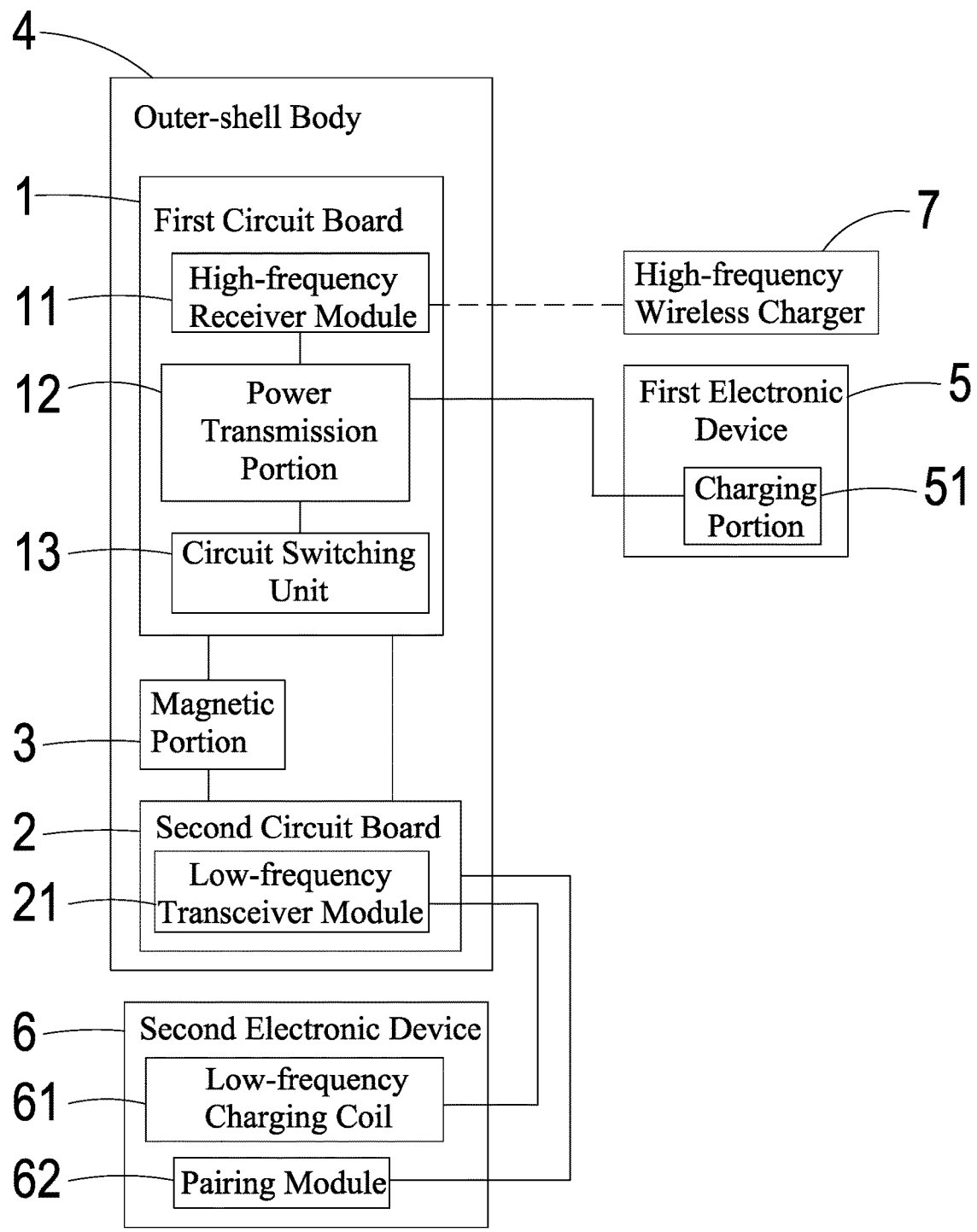
FIG. 3 is a structure block diagram of the preferred embodiment according to the present invention.
Figure 4:
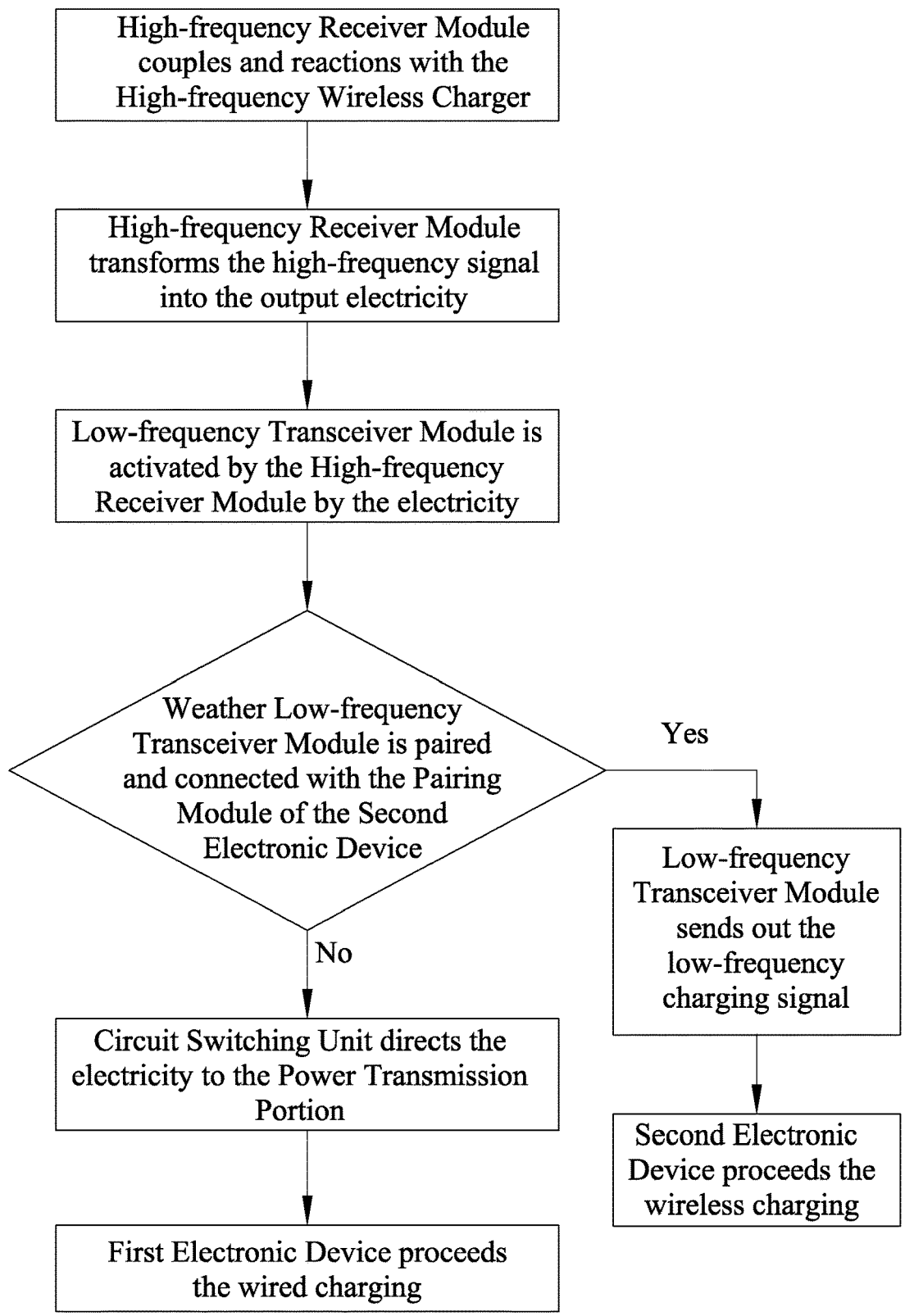
FIG. 4 is a decision block diagram of the preferred embodiment according to the present invention.

As shown in FIG. 1 to FIG. 3, the present invention includes: a first circuit board 1; a high-frequency receiver module 11 set on the first circuit board 1 to provide for wirelessly connecting with a high-frequency wireless charger 7 to transform and produce electricity; at least one power transmission portion 12 set on the first circuit board 1 and electrically connected with the high-frequency receiver module 11 to electrically connect with an first electronic device 5 having a charging portion 51 selectively for wired charging the first electronic device 5; wherein the power transmission portion 12 is one of the Mirco USB, Type C USB, and Lightning connector; a second circuit board 2 set at one side of the first circuit board 1 and electrically connected with the first circuit board 1; a low-frequency transceiver module 21 set on the second circuit board 2 and electrically connected with the high-frequency receiver module 11 to selectively receive the power initiation of the high-frequency receiver module 11 and wirelessly charge a second electronic device 6; wherein the second electronic device 6 has at least one low-frequency charging coil 61 inside to corporately operate with the low-frequency transceiver module 21 and a pairing module 62 to selectively allow the charging action of the low-frequency transceiver module 21; a circuit switching unit 13 set on the first circuit board 1 to direct the electricity produced by the high-frequency receiver module 11 to the power transmission portion 12 when the pairing of the pairing module 62 is failed; at least one magnetic portion 3 set between the first circuit board 1 and the second circuit board 2 to provide for filtering the noise and reducing the interference; wherein the magnetic portion 3 is a windable ferrite magnetic film; and an outer-shell body 4 to provide for accommodating the first circuit board 1, the second circuit board 2, and the magnetic portion 3, which the first circuit board 1, the magnetic portion 3, and the second circuit board 2 are sequentially stacked inside the outer-shell body 4.

As shown in FIG. 1 to FIG. 3, the first circuit board 1, the magnetic portion 3, and the second circuit the board 2 of the present invention are sequentially stacked inside the outer-shell body 4 directly. Therefore, the present invention has the advantages of small volume and carry convenience.

The outer-shell body 4 can just be placed at one side of the high-frequency wireless charger 7 to proceed the charging to the first electronic device 5 or the second electronic device 6 through the high-frequency receiver module 11 or the low-frequency transceiver module 21 when using.

The high-frequency wireless charger 7 of the present invention is majorly for the 6.78 MHz (Mega Hertz) frequency band, therefore it may allow a short distance apart for convenient using when charging because it has an induction range of longer distance than the low-frequency wireless charger.

Figure 5:
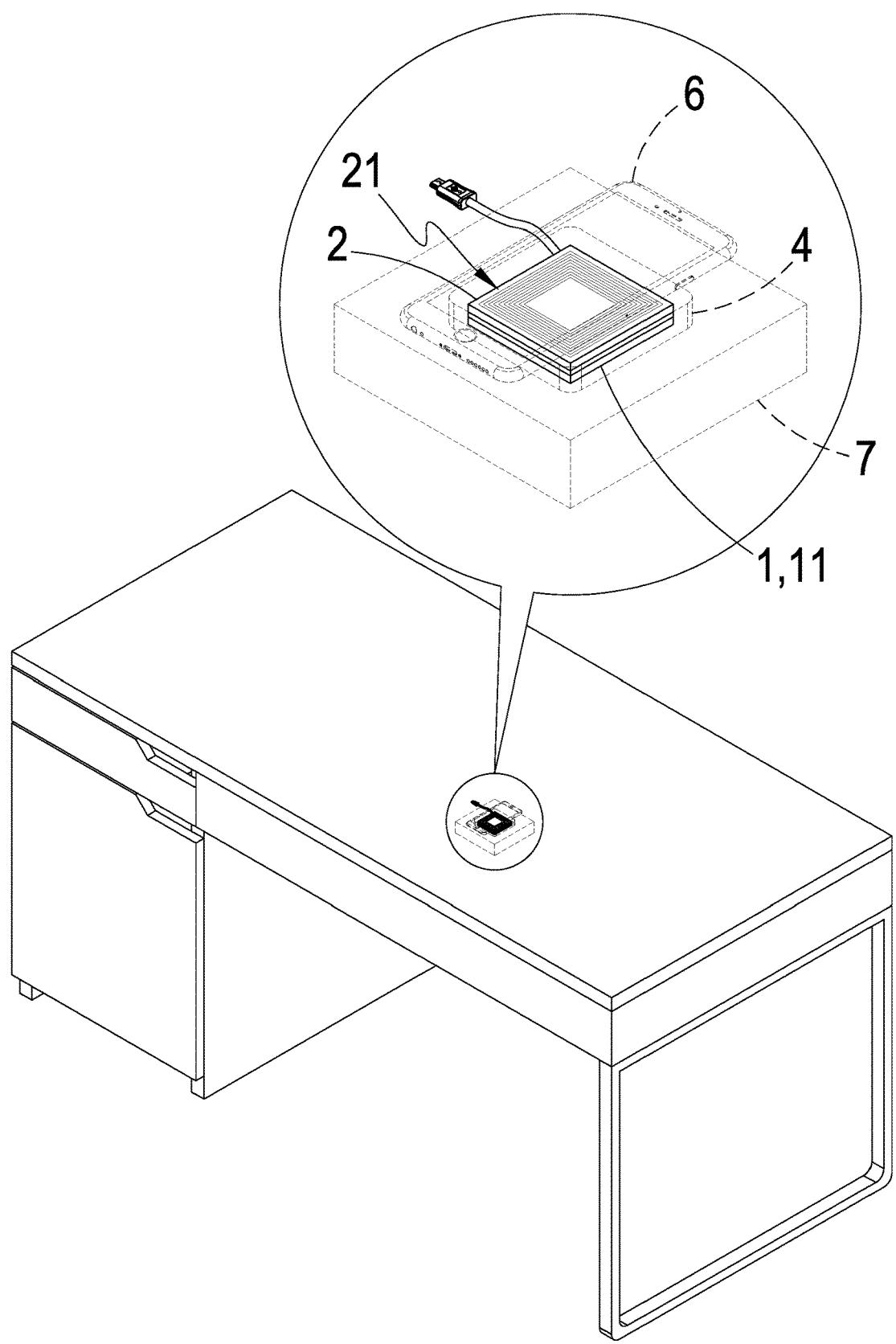
FIG. 5 is an implementation schematic diagram 1 of the preferred embodiment according to the present invention.
Figure 6:
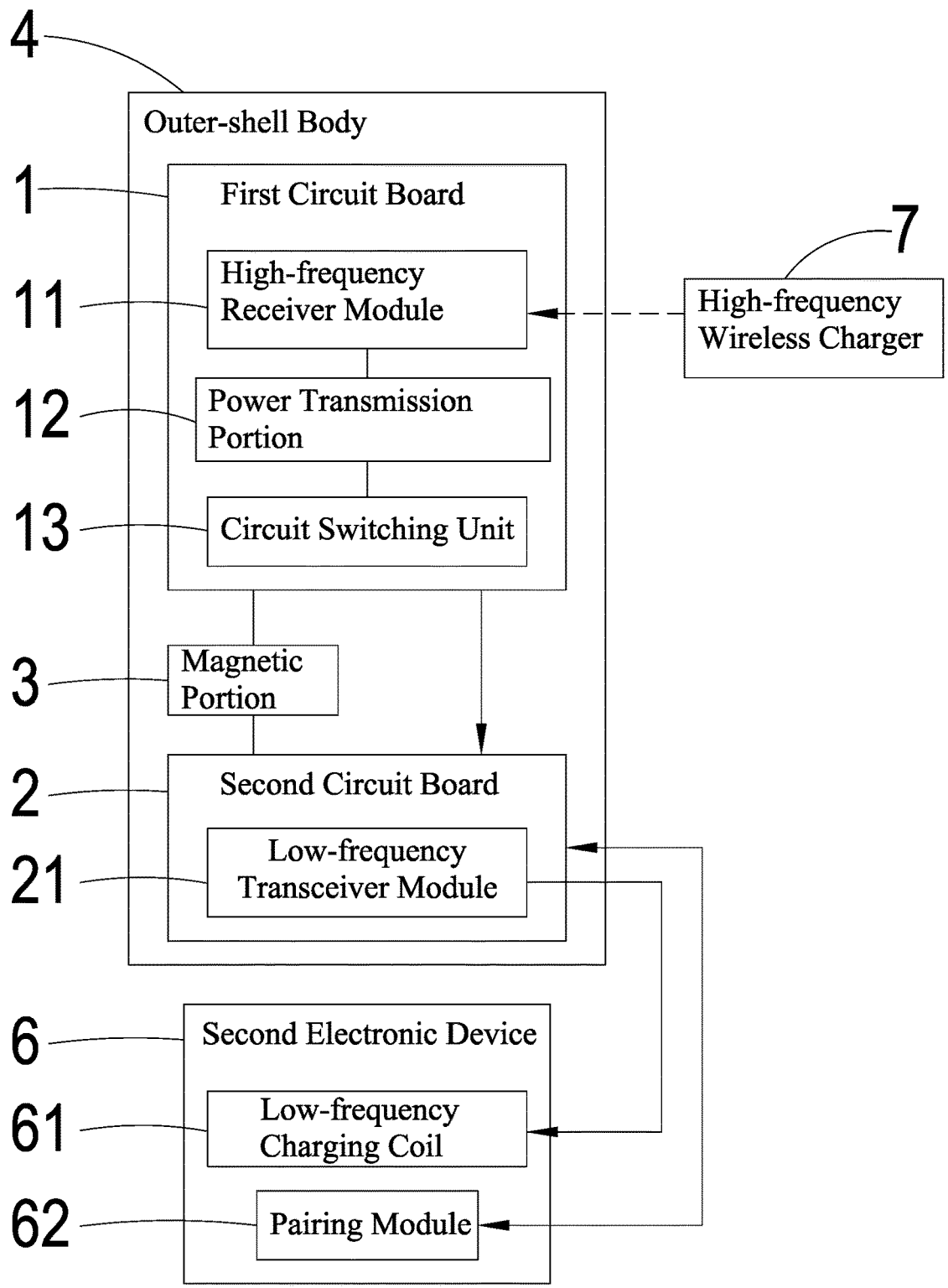
FIG. 6 is a block flow char 1 of the preferred embodiment according to the present invention.

When the second electronic device 6 of the user adopts the iOS operation system and builds in a low-frequency charging coil 61 in the practical use as shown in FIG. 5 to FIG. 6, generally the second electronic device 6 cannot use the high-frequency wireless charger 7 to charge because its frequency band is 100 to 300 kHz (kilohertz).

Nevertheless, the present invention can just be placed between the high-frequency wireless charger 7 and the second electronic device 6 to wirelessly connect with the high-frequency wireless charger 7 to receive the high-frequency signals for transforming and producing electricity through using the high-frequency receiver module 11.

Utilizing the produced electricity to activate the low-frequency transceiver module 21 for achieving the function of the conversion of the high frequency to the low frequency, then utilizing the low-frequency charging signals sent by the low-frequency transceiver module 21 to the second electronic device 6 for accomplishing the low-frequency wireless charging through the pairing module 62 of the second electronic device 6 triggers the action of the wireless charging and the low-frequency charging coil 61 converts the low-frequency charging signals.

When the first electronic device 5 of the user adopts the Android operation system and does not build in a high-frequency charging coil, i.e., does not build in the function of the wireless charging as shown in FIG. 5 to FIG. 6, similarly the user can just place the present invention between the high-frequency wireless charger 7 and the first electronic device 5 to wirelessly connect with the high-frequency wireless charger 7 to receive the high-frequency signals for transforming and producing electricity through using the high-frequency receiver module 11.

Figure 7:
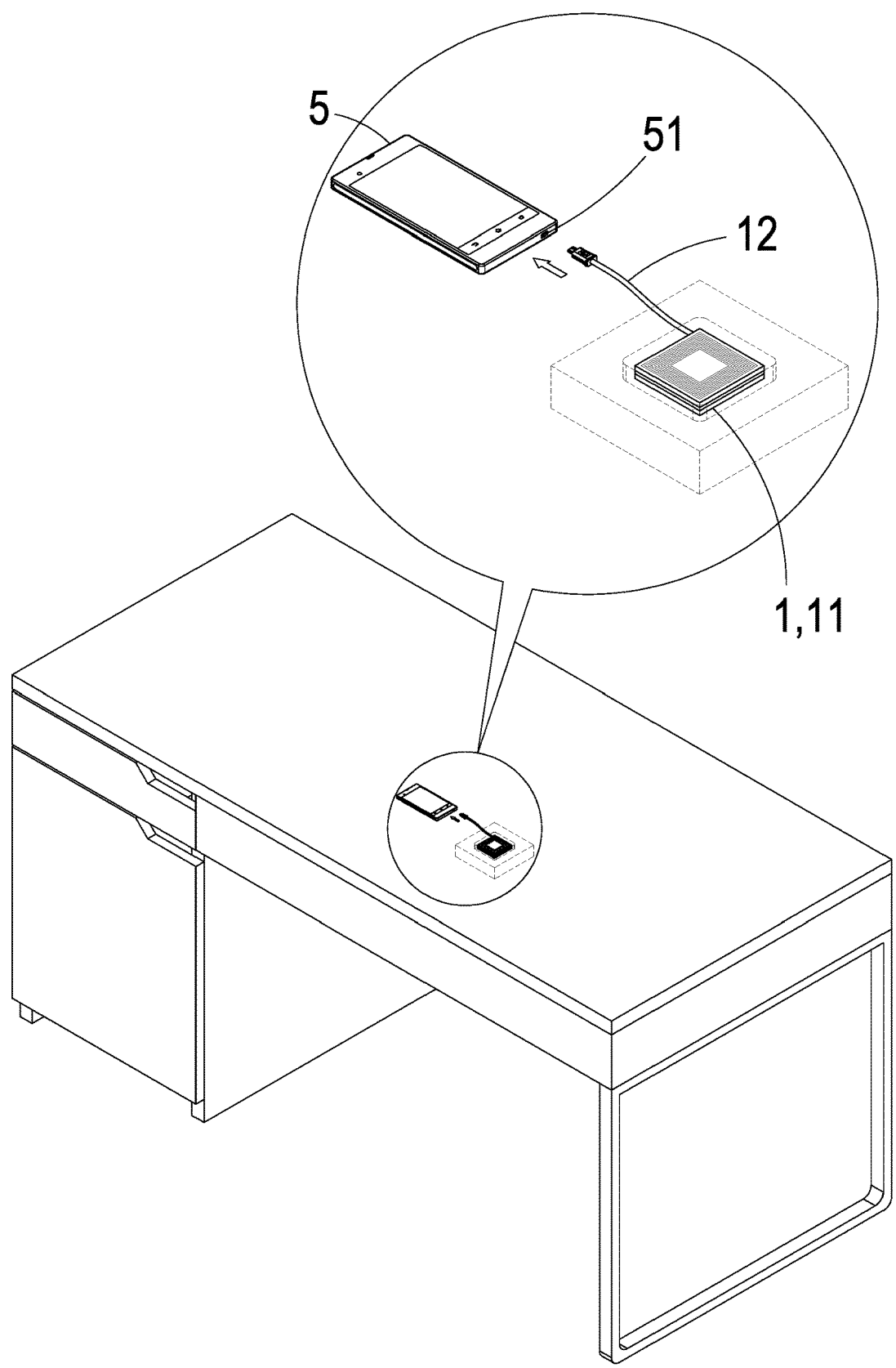
FIG. 7 is an implementation schematic diagram 2 of the preferred embodiment according to the present invention.
Figure 8:
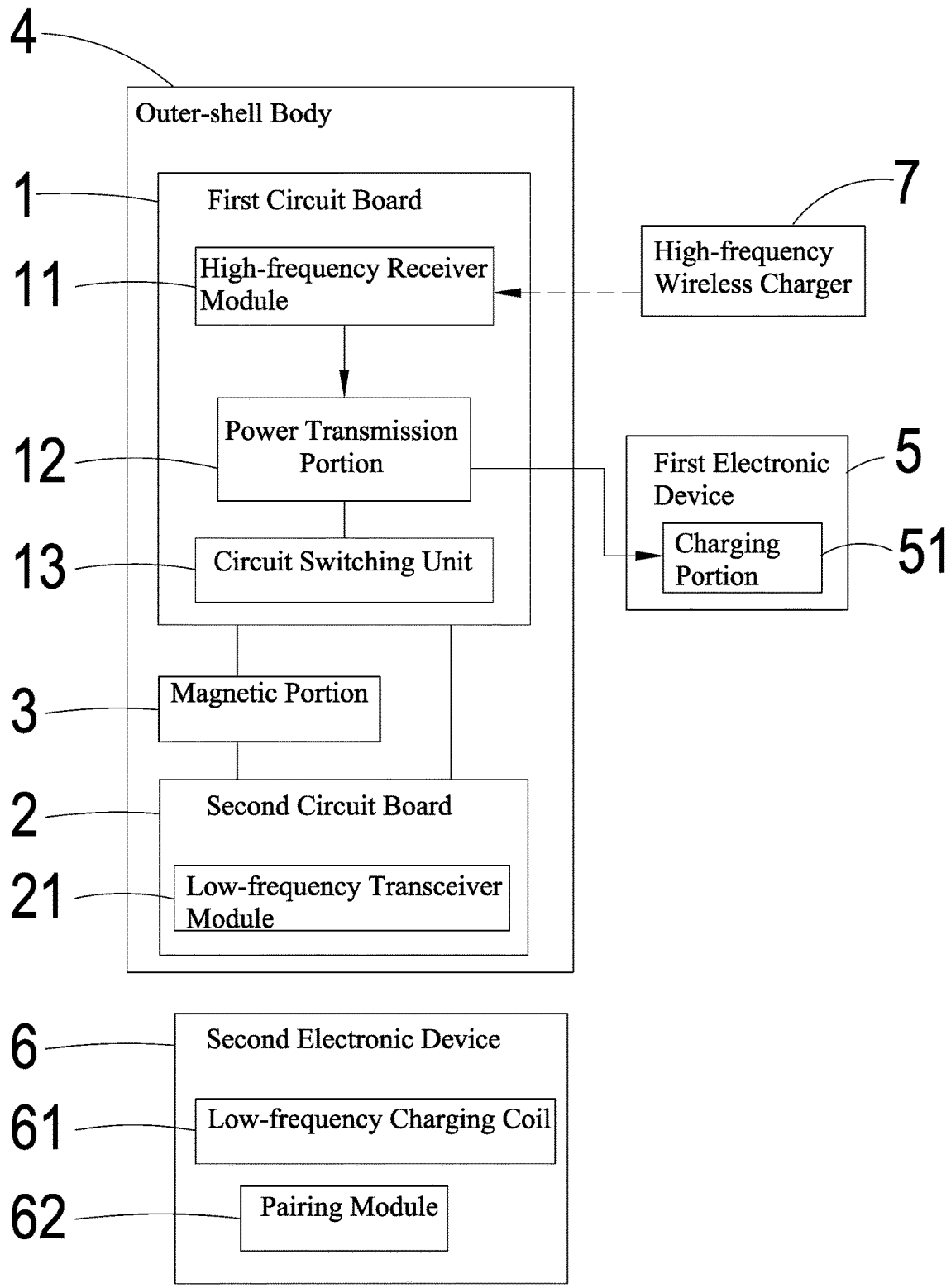
FIG. 8 is a block flow char 2 of the preferred embodiment according to the present invention.

When the first electronic device 5 of the user adopts the Android operation system and does not build in a high-frequency charging coil, i.e., does not build in the function of the wireless charging as shown in FIG. 7 to FIG. 8, similarly the user can just place the present invention between the high-frequency wireless charger 7 and the first electronic device 5 to wirelessly connect with the high-frequency wireless charger 7 to receive the high-frequency signals for transforming and producing electricity through using the high-frequency receiver module 11.

The difference with the previous embodiment is that the pairing failure of the pairing module 62 will cause malfunction when the high-frequency receiver module 11 transmits the electricity to the low-frequency transceiver module 21.

At this time, the circuit switching unit 13 on the first circuit board 1 will automatically direct the electricity produced by the high-frequency receiver module 11 to the power transmission portion 12 and let the electricity electrically connect the with the charging portion 51 of the first electronic device 5 through power transmission portion 12 which includes the physical transmission line to make the first electronic device 5 able to receive the signals of the high-frequency wireless charger 7 for achieving the purpose of the indirect wireless charging.

Additionally, the magnetic portion 3 is positioned between the first circuit board 1 and the second circuit board 2 according to the present invention, the magnetic portion 3 is a windable the ferrite magnetic film made by sealing the whole ferrite magnetic film with glue in this embodiment. Therefore, it can change the magnetic flux path and reduce the phenomenon of the Eddy current when the magnetic flux closes to the metal.

Consequently, it can excellently suppress the electromagnetic interference, prevent the resonance, and inhibit the coupling phenomenon. Besides these advantages, it is thinner in thickness to be windable and effectively lower down the whole height and it has the characteristic of easy cutting to be easily combined inside the outer-shell body 4.

Figure 9:
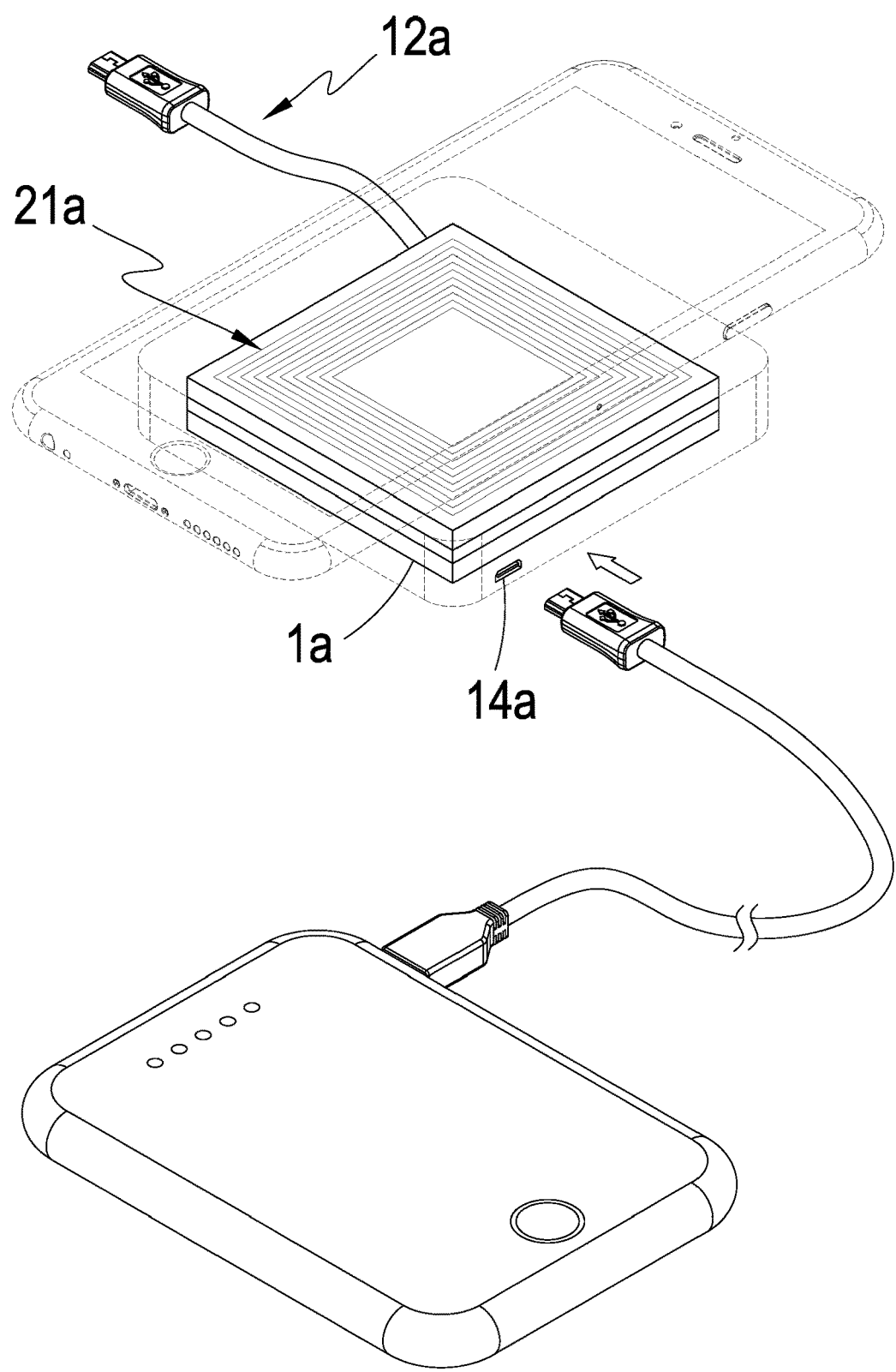
FIG. 9 is an implementation schematic diagram of another preferred embodiment according to the present invention.

As shown in FIG. 9, this embodiment is almost the same with the previous embodiment. The only difference is additionally setting a power receiving portion 14a on the first circuit board 1a to provide for receiving the external power supply to replace the electricity produced by the high-frequency receiver module.

By applying this, it can also directly connect with an external power supply, such as the mobile power, to output the electricity produced by the external power supply to charge through the power transmission portion 12a in a condition without the high-frequency wireless charger.

Otherwise, it can also proceed the wireless charging then through the low-frequency transceiver module 21a, and the charging action is the same as the previous embodiment. Therefore, it is not further described here.

I claim:

1. A multi-function frequency conversion charging device, comprising:
   a first circuit board;
   a high-frequency receiver module set on the first circuit board to provide for wirelessly connecting with a high-frequency wireless charger to transform and produce electricity;
   at least one power transmission portion set on the first circuit board and electrically connected with the high-frequency receiver module to electrically connect with an first electronic device having a charging portion selectively for wired charging the first electronic device;
   a second circuit board set at one side of the first circuit board and electrically connected with the first circuit board;
   a low-frequency transceiver module set on the second circuit board and electrically connected with the high-frequency receiver module to selectively receive the power initiation of the high-frequency receiver module and wirelessly charge a second electronic device; and
   at least one magnetic portion set between the first circuit board and the second circuit board to provide for filtering the noise and reducing the interference.

2. The multi-function frequency conversion charging device according to claim 1, wherein the second electronic device has at least one low-frequency charging coil inside to corporately operate with the low-frequency transceiver module.

3. The multi-function frequency conversion charging device according to claim 1, wherein the second electronic device has a pairing module to selectively allow the charging action of the low-frequency transceiver module.

4. The multi-function frequency conversion charging device according to claim 3, wherein a circuit switching unit set on the first circuit board to direct the electricity produced by the high-frequency receiver module to the power transmission portion when the pairing of the pairing module is failed.

5. The multi-function frequency conversion charging device according to claim 1, further comprising an outer-shell body to provide for accommodating the first circuit board, the second circuit board, and the magnetic portion, which the first circuit board, the magnetic portion, and the second circuit board are sequentially stacked inside the outer-shell body.

6. The multi-function frequency conversion charging device according to claim 1, wherein the magnetic portion is a windable ferrite magnetic film.

7. The multi-function frequency conversion charging device according to claim 1, wherein the using frequency band of the high-frequency receiver module is 6.78 MHz (Mega Hertz).

8. The multi-function frequency conversion charging device according to claim 1, wherein the using frequency band of the low-frequency transceiver module is 100 to 300 kHz (kilohertz).

9. The multi-function frequency conversion charging device according to claim 1, further comprising an outer-shell body to provide for accommodating the first circuit board, the second circuit board, and the magnetic portion; wherein a power receiving portion is set on the first circuit board to provide for receiving the external power supply to replace the electricity produced by the high-frequency receiver module.

10. The multi-function frequency conversion charging device according to claim 1, wherein the power transmission portion is one of the Mirco USB, Type C USB, and Lightning connector.

* * * * *